United States Patent [19]

Elmis et al.

[11] 4,454,531

[45] Jun. 12, 1984

[54] DIGITAL CIRCUIT FOR PROVIDING A BINARY SIGNAL ON THE OCCURRENCE OF A PREDETERMINED FREQUENCY RATIO OF TWO SIGNALS

[75] Inventors: Herbert Elmis, Denzlingen; Adrian Klar, Freiburg, both of Fed. Rep. of Germany

[73] Assignee: ITT Industries, Inc., New York, N.Y.

[21] Appl. No.: 350,556

[22] Filed: Feb. 22, 1982

[30] Foreign Application Priority Data

Mar. 9, 1981 [EP] European Pat. Off. ......... 81101720.1

[51] Int. Cl.³ .............................................. H04N 9/44
[52] U.S. Cl. ...................................... 358/17; 307/527
[58] Field of Search .................. 358/17; 307/510, 511, 307/516, 518, 525, 526, 527, 528

*Primary Examiner*—Richard Murray
*Attorney, Agent, or Firm*—James B. Raden; Donald J. Lenkszus

[57] ABSTRACT

The invention provides a digital circuit for generating a binary signal output when a predetermined frequency ratio, $v = f1/f2$, of two signals F1 and F2 occurs during a selected measuring period. The circuit is particularly adapted for use in a color television receiver to determine the ratio between the chrominance-subcarrier frequency and the horizontal frequency, which ratio is fixed at the transmitting end, both in the PAL system and the NTSC system.

5 Claims, 2 Drawing Figures

DIGITAL CIRCUIT FOR PROVIDING A BINARY SIGNAL ON THE OCCURRENCE OF A PREDETERMINED FREQUENCY RATIO OF TWO SIGNALS

BACKGROUND OF THE INVENTION

1. Field of the Invention

The present invention relates to a digital circuit for providing a binary signal on the occurrence of a predetermined frequency ratio, $v = f1/f2$, of two signals F1, F2 during a selectable measuring period and, more particularly, to such a circuit as used in a color-television receiver.

2. Description of the Prior Art

A digital circuit of the aforementioned type is needed in color-television receivers to determine the ratio between the chrominance-subcarrier frequency and the horizontal frequency, which ratio is fixed at the transmitting end both in the PAL system and in the NTSC system. This "recognition" signal can be used to lock the horizontal deflection oscillator, via a frequency divider dividing by a fixed number, to the chrominance-subcarrier oscillator, designed as a phase-locked loop, during a color-television broadcast, so that advantage can be taken of the considerably better noise immunity of the phase-locked loop, which includes a crystal oscillator.

In the case of a nonstandard ratio between chrominance-subcarrier frequency and horizontal frequency, however, it must be possible, like in conventional circuits, to synchronize the horizontal deflection oscillator by means of the horizontal synchronizing pulses separated from the transmitted composite color signal. This is particularly important because even under normal transmitting conditions switchover between the standard ratio and a nonstandard ratio of the two signals or horizontal-and field-frequency phase shifts may occur at the transmitting end. To avoid constant switching between the two above-described modes of synchronization of the horizontal deflection oscillator, the digital circuit must be able to reliably recognize normal television signals, in which the frequency ratio is only in the vicinity of the predetermined or standard frequency ratio, as signals with a nonstandard ratio, i.e., it must have a high degree of accuracy.

While the problem underlying the invention was just explained in connection with color-television receivers, the use of the invention is not limited to this specific case, which represents only a preferred application of the invention.

SUMMARY OF THE INVENTION

The object of the invention is to provide a generally applicable digital circuit which delivers a binary signal on the occurrence of a predetermined frequency ratio between two signals during a selectable measuring period. The output signal is to be a binary signal, one state of which indicates the presence of the predetermined frequency ratio, while its other state indicates the absence of that ratio.

Advantages of the invention are that it is implemented with all-digital circuitry and, thus, is ideally suited for monolithic integration, particularly for integration using insulated-gate field-effect transistors, i.e., so-called MOSFET technology.

DESCRIPTION OF THE INVENTION

Figure 1:
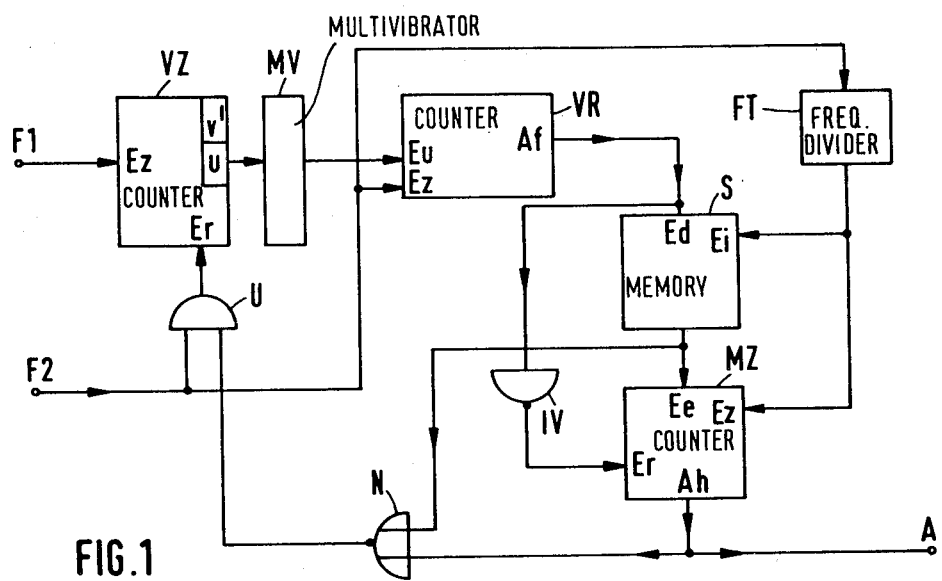
FIG. 1 is a block diagram of an embodiment of the invention.

In the embodiment shown in the block diagram of FIG. 1, the first signal F1, whose frequency f1 is higher than the frequency f2 of the second signal F2, is applied to the count input Ez of an up-counter VZ. Since, in the initial condition of the digital circuit and in positive logic, which is assumed herein, the more positive level H of two binary-signal levels appears at the output of the NOR gage N, the up-counter VZ is reset with every pulse of the second signal F2, for its reset input Er is connected to the output of the AND gage U.

The capacity z of the up-counter VZ is chosen to be greater than the frequency ratio $v = f1/f2$; the count corresponding to this frequency ratio is designated $v'$. The output for a count u lying close before the count $v'$ is coupled to the trigger input of the monostable multivibrator MV. The latter is thus triggered once per count cycle, because the aforementioned resetting of the up-counter VZ does not take place until the count $v'$ is reached.

The dwell time k of the monostable multivibrator MV is equal to twice the period required by the up-counter VZ to count from the count u to the count $v'$. The output of the monostable multivibrator MV is applied to the up-down control input Eu of the up-down counter VR, whose count input Ez is fed with the second signal F2 and in which the zero state and the maximum count are locked up. An H level at the up-down control input Eu causes the counter to count up, while the more negative level L of the two binary-signal levels causes the counter to count down. The up-down counter VR determines whether the output signal of the monostable multivibrator MV and the second signal F2 are in coincidence, i.e., in phase. By the forward/backward counting and by taking off an output signal at a given count, it is ascertained whether the average phase relationship between the output signal of the monostable multivibrator MV and the second signal F2 corresponds to the desired value. This count output Af corresponds to about one-fifth of the maximum count of the up-down counter VR. The average phase relationship corresponds to the desired value if the count Af is exceeded, in which case the corresponding output is constantly at H level.

The count output Af of the up-down counter VR is connected to the data input Ed of a memory S having a control input Ei which causes an L level appearing at the count output Af to be written into the memory during application of the output pulse from the frequency divider FT and to be read at the end of the output pulse from the frequency divider FT and then erased; an H level constantly applied during the output pulse from the frequency divider FT is also read at the end of the pulse and then erased. The input of the frequency divider FT is presented with the second signal F2, and the divider divides by a number on the order of 100.

In the above-mentioned preferred application of the circuit in color-television receivers, this frequency divider FT can be dispensed with, and pulses synchronous with the vertical deflection must then be applied to the control input Ei of the memory S.

The memory S thus stores during each frequency-divider cycle an L level appearing at the count output Af of the up-down counter VR during this cycle or an H level constantly appearing at this output. It is thus determined whether or not the average phase relationship corresponded to the desired value during the previous frequency-divider cycle. In the preferred application of the circuit in color-television receivers, it is thus determined whether the average phase relationship between the output signal of the monostable multivibrator MV and the second signal F2, which has the horizontal frequency in this case, corresponded to the desired value or not.

The count input Ez of the measuring-period-determining counter MZ, whose maximum count is locked up, is connected to the output of the frequency divider FT, and its enable input Ee is connected to the output of the memory S, while its maximum-count output Ah is the output of the digital circuit. The count output Af of the up-down counter VR is connected to the reset input Er of the counter MZ through the inverter IV. The counter MZ thus counts all frequency-divider cycles or field periods in which the aforementioned coincidence was present. If the counter MZ reaches its maximum count without having been reset via its reset input Er, the output A will be at H level, i.e., the output signal of the monostable multivibrator MV and the second signal F2 remained in phase during a cycle of the counter MZ. The aforementioned resetting via the reset input Er takes place via the inverter IV if noncoincidence existed during a frequency-divider cycle.

In color-television receivers, the capacity of the counter MZ is on the order of 1,000, i.e., if the aforementioned coincidence occurred during 1,000 field periods, for example, an H level would appear at the output A.

This H level, like an H level at the output of the memory S, also causes the H level appearing at one of the two inputs of the AND gate U in the abovementioned initial state of the digital circuit to be changed to an L level via the NOR gate N, whose first input is fed with the output from the memory S and whose second input is connected to the output Ah of the counter MZ, so that the up-counter VZ will not be reset by the second signal F2.

Figure 2:
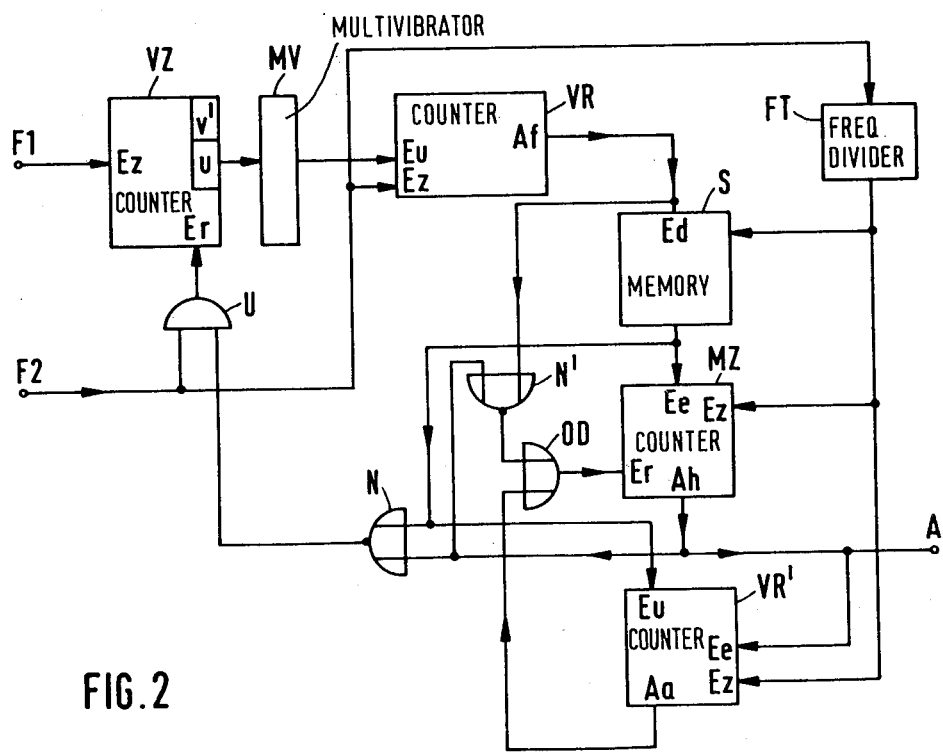
FIG. 2 is a block diagram of a further development of the embodiment of FIG. 1.

FIG. 2 shows a further development of the arrangement of FIG. 1 with which noise immunity can be improved. The additional up-down counter VR', whose up-down control input Eu is connected to the output of the memory S and which is caused to count down and up by an H level and an L level, respectively, and the OR gate OD change the H level at the output Ah of the counter MZ to an L level not already on each noncoincidence but only after the count of the output Aa of the additional up-down counter VR' is reached, which output is connected to one of the inputs of the OR gate OD. The other input of this OR gate is connected to the output of the additional NOR gate N', which replaces the inverter IV of FIG. 1 and whose first input is connected to the count output Af. Its second input is connected to the output A of the digital circuit, and its output is coupled to the reset input Er of the counter MZ. The count input Ez of the additional up-down counter VR' is fed with the output pulses of the frequency divider FT, while its enable input Ee is connected to the output A of the digital circuit. In color-television receivers, it suffices to count a few, e.g., four, field periods by means of the additional up-down counter VR'.

If the invention is used in PAL color-television receivers, it is necessary to adapt the digital circuit to the nonintegral ratio between the four-fold chrominance-subcarrier frequency of 17.7 ... MHz and the horizontal frequency of 15.625 ... kHz by setting the frequency-ratio count v' of the up-counter VZ to 1,137 for a single count cycle per field period, and to 1,135 for the remaining count cycles in each field period. This changeover is not necessary in NTSC color-television receivers because the chrominance-subcarrier-frequency-to-horizontal-frequency ratio is an integer there.

What is claimed is:

1. A digital circuit for providing a binary signal on the occurrence of a predetermined frequency ratio between the frequencies of a first and a second signal during a suitable measuring period, comprising:

an up-counter having a capacity greater than the predetermined frequency ratio, said up-counter having a count input, an output for a first count that is slightly lower than a second count corresponding to the predetermined frequency ratio, the higher frequency first signal being applied to the count input;

a monostable multivibrator having a trigger input, a dwell time equal to twice the period required by the up-counter to count from the first count to the second count output, said trigger input connected to the first count output of the up-counter;

an up-down counter having a control input being connected to the output of the monostable multivibrator, a count input provided with the second signal, the zero state and maximum count being locked up and a count output corresponding to about one-fifth of the maximum count;

a memory having a control input and a data input, said data input being connected to the output of the updown counter, said control input being such that when it receives a pulse, it causes an L level signal appearing at the data input to be written into the memory and to be read at the end of said pulse and then erased;

means for providing pulses to the control input in response to one of two signals including the second signal and signals synchronous with the vertical deflection of a television receiver;

a measuring period determining counter whose maximum count is locked up having a count input, an enable input, a maximum count output and a reset input, the count input being connected to the output of the means for providing pulses, the enable input being connected to the output of the memory, the maximum count output providing the output of the digital circuit;

inverter means for receiving the count output of the up-down counter and for providing a signal inversely corresponding thereto, said signal being provided to the reset input of the measuring period determining counter;

a NOR gate having a first input connected to the output of said memory and a second input connected to the output of the digital circuit and an output; and an AND gate having a first input connected to the output of the NOR gate and a second input receiving the second signal and having an output connected to the reset input of the up-counter.

2. A digital circuit as described in claim 1, additionally comprising:

a second up-down counter having a count input connected to the output of the means for providing pulses, an enable input connected to the output of the digital circuit, an up-down control input connected to the output of the memory and an output;

said inverter means comprising a NOR gate having a first input connected to the output of the updown counter and a second input connected to the output of the digital circuit and providing an output; and an OR gate having a first input connected to the output of the NOR gate and a second input connected to the output of the additional up-down counter, said OR gate having an output connected to the reset input of the counter.

3. A digital circuit as described in claim 1 or 2 for use in a color television receiver to sense the fixed ratio between chrominance-subcarrier frequency and horizontal frequency in the received signal wherein the first signal is the chrominance-subcarrier frequency and the second signal is the horizontal frequency.

4. A digital circuit as described in claim 3 for use in PAL color television receivers wherein the circuit is adapted to the precise ratio between the four-fold chrominance-subcarrier frequency and the horizontal frequency by arranging that the frequency ratio count of the up-counter is 1,137 for a single count cycle per field period but 1,135 for the remaining count cycles of each field period.

5. A digital circuit as described in claim 4, wherein the pulse means comprises a frequency divider adapted to receive the second signal.

* * * * *